(12) United States Patent
Johnstone

(10) Patent No.: US 6,672,048 B2
(45) Date of Patent: Jan. 6, 2004

(54) ROTARY IMPELLER DRIVEN TURBINE

(76) Inventor: Duncan Johnstone, 6440 Tucker Ave., McLean, VA (US) 22101

( * ) Notice: Subject to any disclaimer, the term of this patent is extended or adjusted under 35 U.S.C. 154(b) by 0 days.

(21) Appl. No.: 10/191,278

(22) Filed: Jul. 10, 2002

(65) Prior Publication Data

US 2003/0010013 A1 Jan. 16, 2003

Related U.S. Application Data

(60) Provisional application No. 60/303,766, filed on Jul. 10, 2001.

(51) Int. Cl.[7] ................................................. F02C 3/14
(52) U.S. Cl. ....................................................... 60/39.35
(58) Field of Search ............................ 60/39.35, 39.34; 415/80; 416/20 R, 21

(56) References Cited

U.S. PATENT DOCUMENTS

| 63,148 | A | * | 3/1867 | Ely ............................. 60/227 |
| 1,021,521 | A | * | 3/1912 | Heroult ....................... 60/39.34 |
| 2,544,420 | A | * | 3/1951 | Goddard ..................... 60/39.35 |
| 3,481,531 | A | | 12/1969 | MacArthur et al. |
| 3,856,432 | A | | 12/1974 | Campagnuoloeta |
| 4,023,350 | A | | 5/1977 | Hovan et al. |
| 4,473,199 | A | | 9/1984 | Magill |
| 5,067,447 | A | | 11/1991 | Iwaki et al. |
| 5,082,048 | A | | 1/1992 | Iwaki et al. |
| 5,088,452 | A | | 2/1992 | Iwaki et al. |
| 5,092,281 | A | | 3/1992 | Iwaki et al. |
| 5,408,824 | A | * | 4/1995 | Schlote ....................... 60/39.35 |
| 5,425,619 | A | | 6/1995 | Aylor |
| 5,697,221 | A | | 12/1997 | Sapru et al. |
| 5,882,623 | A | | 3/1999 | Zaluska et al. |
| 5,987,895 | A | | 11/1999 | Nishimura et al. |
| 6,097,164 | A | | 8/2000 | DeRosa |
| 2003/0000200 | A1 | * | 1/2003 | Watkins ....................... 60/218 |

* cited by examiner

*Primary Examiner*—Ehud Gartenberg
(74) *Attorney, Agent, or Firm*—Hunton @ Williams LLP; Patrick A. Doody

(57) ABSTRACT

The invention relates to a rotary impeller driven caturbine whereby relatively small engines are placed at or near the ends of at least two opposing impeller blades on a rotor. The engines propel the impeller blades to turn the rotor and shaft which in turns generates power. The engines are powered by a combustible reaction that produces steam, preferably by catalytic decomposition of hydrogen peroxide.

10 Claims, 3 Drawing Sheets

ROTARY IMPELLER DRIVEN TURBINE

This claims the benefit of provisional application Ser. No. 60/303,766 filed on Jul. 10, 2001.

BACKGROUND OF THE INVENTION

1. Field of the Invention

The invention relates to a rotary impeller driven turbine whereby relatively small engines are placed at or near the ends of at least two opposing impeller blades on a rotor. The engines propel the impeller blades to turn the rotor and shaft which in turns generates power. The engines are powered by a catalytic combustible reaction that produces steam, preferably by catalytic decomposition of hydrogen peroxide. The invention therefore relates to a caturbine, or "catalytic turbine."

2. Description of Related Art

Creating power by turning a rotor, or wheel, has been known for ages. Water wheels once generated the power needed to crush grain. Giant dams have been built to drive wheels to generate power and electricity. More recent advances have used various mechanisms to generate steam to impinge on rotor impellers (some of which were equipped with cup-like devices to more readily receive the steam) to turn the rotor, and consequently, generate energy. Much research has gone into the various mechanisms to generate the steam.

In a gas and steam-turbine plant, heat contained in an expanded working medium (flue gas) from the gas turbine is utilized to generate steam for the steam turbine. The heat transfer is effected in a heat-recovery steam generator, which is connected downstream of the gas turbine on the flue-gas side and in which heating areas are disposed in the form of tubes or banks of tubes. The latter in turn are connected in the water/steam circuit of the steam turbine. The water/steam circuit normally includes a plurality of pressure stages, for example two pressure stages. Each pressure stage has a preheating and an evaporator heating area.

The steam generated in the heat-recovery steam generator is fed to the steam turbine, where it expands to perform work. In this case, the steam turbine may include a number of pressure stages, which are adapted in their number and layout to the structure of the heat-recovery steam generator. The steam expanded in the steam turbine is normally fed to a condenser and condenses there. The condensate resulting during the condensation of the steam is fed again as feed water to the heat-recovery steam generator, so that a closed water/steam circuit is obtained.

The turbine rotor of a steam turbine of this type is normally mounted in a number of axial and/or radial bearings. One of these bearings, also referred to as the end bearing, is arranged in the interior, for example in the inner hub, of the exhaust steam housing and is used to fix that end of the shaft of the turbine rotor which is located in the exhaust steam housing. The end bearing is normally constructed as a radial bearing, that is to say as a bearing that absorbs radial forces.

The condenser of such a gas and steam-turbine plant, like a heat exchanger, can normally be acted upon by a cooling medium, which extracts heat from the steam for the condensation. In that case, water is normally provided as the cooling medium. As an alternative, however, the condenser may also be constructed as an air condenser, to which air is admitted as the cooling medium.

Wind Turbines provide a source of electrical power as an alternative to fossil fuels to help reduce gaseous emissions and other environmental problems. Wind turbines also provide electrical power in remote areas where power lines have not been strung. Accordingly, numerous wind turbines have been installed in high wind areas in the United States and other countries.

Wind turbines have either horizontal axes or vertical axes of rotation, with each type having different advantages and disadvantages. Vertical axis turbines have, among other advantages, little or no need for a tower on which to mount the turbines. The turbine, gearing electrical generators and the like can generally be mounted at ground level.

Most wind turbines are subject to possible damage from excessively high winds. Vertical axis turbines are less vulnerable to damage from high winds because such turbines are not usually mounted on towers that can be blown over. However, high winds can damage vertical axis turbines by causing them to run at excessively high speeds (RPM), which can cause catastrophic failure of the rotor, gearing, etc.

It is known to provide speed limiters or governors for wind turbines to reduce the risk of damage from high winds and excessively high speed rotation of the turbines. For example, U.S. Pat. No. 5,425,619 to Aglor discloses a horizontal axis turbine having spring-loaded gate flaps which open responsive to predetermined levels of air pressure to spill air through outlets instead of across the air-engaging blades in the turbine. U.S. Pat. No. 3,856,432 discloses a vertical axis turbine having leaves made of resilient material which are unfolded by centrifugal forces at predetermined rotational speeds to interfere with air that would otherwise cause the rotor to speed out of control. U.S. Pat. Nos. 591,962; 1,586,914 and 4,004,861 also disclose systems for controlling the speed of wind turbines.

A turbine blade or vane for use in the wet steam region of the penultimate and final stages of turbines is described in German published, non-prosecuted Patent Application DE 195 46 008 A1. Such a turbine blade or vane is subject to erosive wear due to impinging water droplets. This erosive wear is reduced by the airfoil of the turbine blade or vane having surface roughness in the region of its leading edge and the region of the suction surface of the blade or vane or in at least a partial region thereof, which surface roughness is markedly increased relative to the surface roughness of the pressure surface of the airfoil. A film of water is held on the surface of the turbine blade or vane by this surface roughness. This film of water reduces the erosive effect of impinging water droplets.

German Patent DE 36 095 41 C2 deals with the reduction of the aerodynamic drag of a body in turbulent flow. The reduction in drag is achieved by reducing the turbulent wall shear stress. For this purpose, the surface of the body is provided with ribs in a plurality of rib formations. The ribs are arranged offset to one another laterally to a flow direction and have short extensions in the flow direction. In particular, DE 36 095 41 C2 reveals such a surface structure for reducing the drag of an aircraft wing.

German published, non-prosecuted Patent Application DE 43 19 628 A1 deals with the structuring of turbo-machine surfaces in contact with fluid. The flow losses are minimized by a applying a grooved structure. The special relationships of fluid pumps are taken into account in this publication.

German Utility Model G 90 13 099 relates to a rotor for extracting energy from a flowing medium or for releasing energy to a flowing medium consisting of a hub and at least one rotor blade. An increase in the efficiency of the rotor is achieved by a rotor blade of the rotor having a corrugated shape. In addition to the absolutely necessary corrugated shape, such a rotor blade can also be completely covered with grooving.

An impeller for a centrifugal compressor, in particular for a gas turbine, is described in U.S. Pat. No. 3,481,531. The impeller has vanes which extend radially outward and between which is located an impeller wall. The impeller wall is provided with grooves which extend radially outward so that a boundary layer of gas adhering to the wall is broken up and energy losses are therefore minimized.

U.S. Pat. No. 4,023,350 illustrates an appliance that reduces pressure loss in a gas turbine. The appliance consists of a chain of protrusions which extends between two adjacent blades or vanes of a blading ring of the gas turbine. This chain of protrusions acts to generate a vortex so that a boundary layer thickness, and therefore losses due to transverse flows, are reduced.

In the VDI reports No. 1109 of 1994, Jetter and Rie β describe on page 241 of the article "Aerodynamic Properties of Turbine Blading Profiles of Different Manufacturing Qualities", the influence of surface roughness on the efficiency of turbine lading profiles. The article states that surface roughnesses, such as milling grooves, have an influence on the profile loss but, because of the importance of other parameters, this influence cannot yet be accurately quantified.

A steam turbine is considered in the book "Turbomachines" by Klaus Menny, B. G. Teubner Stuttgart, 1995. It is stated therein that water turbines, steam and gas turbines, windmills, centrifugal pumps and centrifugal compressors and propellers are combined under the collective designation of "turbo-machines". A common feature of all these machines is that they are used for the purpose of withdrawing energy from an active fluid in order to drive another machine or to supply energy to an active fluid in order to increase the pressure of the latter. Using a simple turbine as an example, the mode of operation of a turbomachine is explained. The active fluid enters the machine and flows first through a blading ring of stationary guide vanes. This increases the velocity and therefore the kinetic energy of the active fluid. Its pressure and therefore its potential energy are reduced. At the same time, the shape of the guide vanes produces a velocity component in the peripheral direction of a rotor blade ring downstream of the guide vane ring. By means of the rotor blade ring, the active fluid gives up its kinetic energy to the rotor, to which the rotor blade ring is connected, because the direction and frequently also the magnitude of the velocity of the active fluid is changed when flowing over the rotor blades. The rotor blade ring is made to rotate. The active fluid emerges from the machine with reduced energy content. The ratio between the mechanical energy gained from the turbine and the energy withdrawn from the active fluid characterizes the efficiency of the turbine.

Nuclear energy also can be used to create stream to drive a rotor blade ring or assembly, but these reactors suffer from obvious safety and environmental drawbacks. Other mechanisms have employed combustible fuels to generate the steam. For example, U.S. Pat. No. 6,097,164 discloses the use of an Arvil Porter type rocket motor that receives hydrogen peroxide fuel, and catalytically decomposes the hydrogen peroxide with a suitable catalyst to produce steam in a violent reaction. The steam impinges on and drives a flywheel that in turn generates power. These and other systems are inefficient insofar as some of the steam misses the impellers on the flywheel and thus goes unused, thereby generating exorbitant amounts of steam that must be exhausted from the system.

Gilbert Magill invented some time ago a portable, one-man helicopter powered by rocket engines disposed at the tips of rotor blades. U.S. Pat. No. 4,473,199 discloses such a system. The rocket engines can be comprised of small engines that catalytically decompose a fuel to create steam which exits the engine at rapid speeds thereby creating a reactive force that rotates the rotor about its shaft. To date, the one man helicopter has not been successful, although the Intora Firebird currently is under development in England.

There exists a need to provide a system that can generate power without adversely affecting the environment, and without depleting our natural resources. In addition, there exists a need to develop a system for generating power that does not suffer from inefficiencies in the use of steam, and does not require excessive exhaust of unused steam (condensed or uncondensed).

Each of the documents described above is incorporated by reference herein in its entirety.

SUMMARY OF THE INVENTION

There is a need to solve the problems noted above. For example, there is an increasing need to provide a turbine that can generate power with little excess waste, and with little or no pollution generated by burning of fossil fuels, or use of nuclear energy.

It is therefore a feature of an embodiment the present invention to provide a turbine having a rotor with a plurality of impeller blades whereby at least two rocket engines are mounted on opposed impeller blades to drive the rotor. The rocket engines are designed to generate exhaust that does not contain any substantial amount of toxins, and that are capable of producing the exhaust without the need for fossil fuels or nuclear energy.

In accordance with a preferred feature of an embodiment of the invention, the rocket engines produce steam by catalytically decomposing hydrogen peroxide. In accordance with another preferred feature of an embodiment of the invention, the rocket engines produce steam by reaction of water with a metal hydride to produce hydrogen, which then is combusted in a suitable combustion chamber to generate steam exhaust. The steam exhaust generated by the rocket engine is capable of rotating the impeller blades on the rotor by virtue of their axially opposed attachment to opposing impeller blades.

These and other features of the invention will be readily apparent to those skilled in the art upon reading the description of preferred embodiments that follows.

BRIEF DESCRIPTION OF THE DRAWINGS

In the drawings, like numerals represent like embodiments.

DESCRIPTION OF PREFERRED EMBODIMENTS

The invention relates in general to a Caturbine that is powered by rocket engines attached at axially opposed ends of impeller blades of the rotor. Throughout this description, the expression "rocket engine" denotes any device that is capable of generating thrust by the opposing force of exhaust. It is preferred in the invention that the exhaust is substantially comprised of steam (trace impurities are acceptable), or carbon dioxide and steam (again, trace impurities are acceptable).

Figure 1:
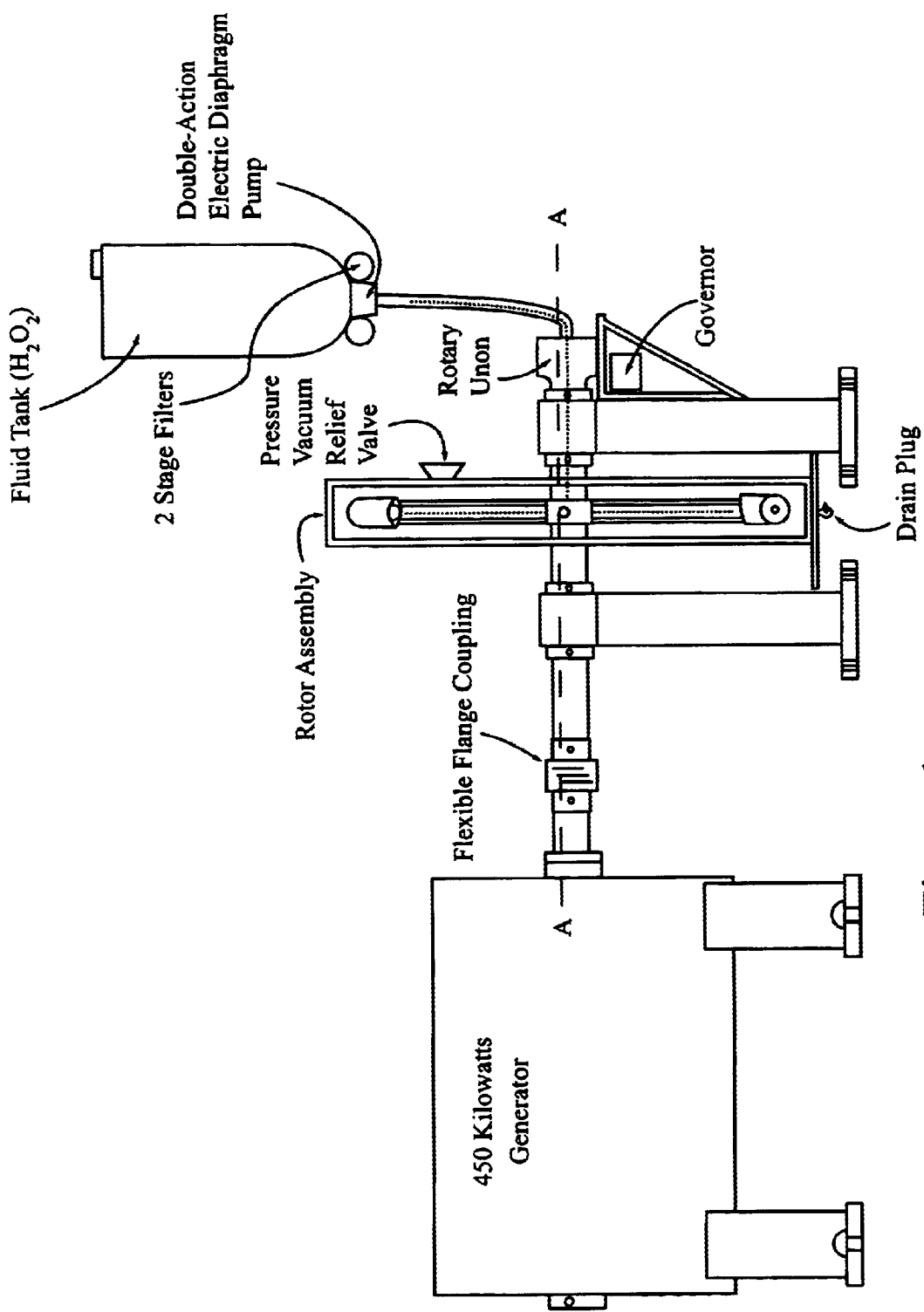
FIG. 1 illustrates a preferred turbine assembly in accordance with the invention whereby the rotor is disposed vertically.

As shown in FIG. 1, the turbine generally comprises a rotor comprising at least two impeller blades (FIG. 2), whereby a catalytic steam turbine jet, e.g., rocket engine, is attached at the distal opposing ends of the two axially opposed impeller blades. The catalytic steam turbine jet preferably is powered by the catalytic decomposition of hydrogen peroxide whereby the fuel, hydrogen peroxide, is fed to the rotor via fluid holding tank. The fluid fuel can be fed directly to the catalytic steam turbine jet by passing through a filtering medium, e.g., a two stage filter, and through, for example, a double action electric diaphragm pump.

Pressure generated in the rotor by exhaust of steam from the catalytic steam turbine jet can be relieved at pressure vacuum relief valve, and condensed steam can be removed from the rotor by the drain plug. The invention therefore encompasses an enclosed rotor system that is self-propelled by virtue of the catalytic steam turbine jets disposed at or near the end of axially opposed impeller blades. A governor may be present to control the speed of rotation of the rotor assembly, and a rotary union may be employed to effect sufficient rotation.

Rotation of the rotor in rotor assembly can be used to generate power using any of the techniques known in the art for generating power by a rotating member. A preferred embodiment of the invention encompasses the use of a generator that is capable of generating power by transferring the kinetic energy generated by the rotor assembly into storable energy in the form of, for example, electricity, and the like. It is preferred to employ a flexible flange coupling between the rotor assembly and the generator to prevent vibration of the generator mechanism.

While the embodiment shown in FIG. 1 illustrates the rotor assembly vertically disposed, those skilled in the art will appreciate that the rotor assembly may be disposed in any suitable configuration, including, off-set vertically, or horizontal. Various modifications, additions, and deletions may be made to the turbine depicted in FIG. 1, as will be appreciated by those skilled in the art.

Figure 2:
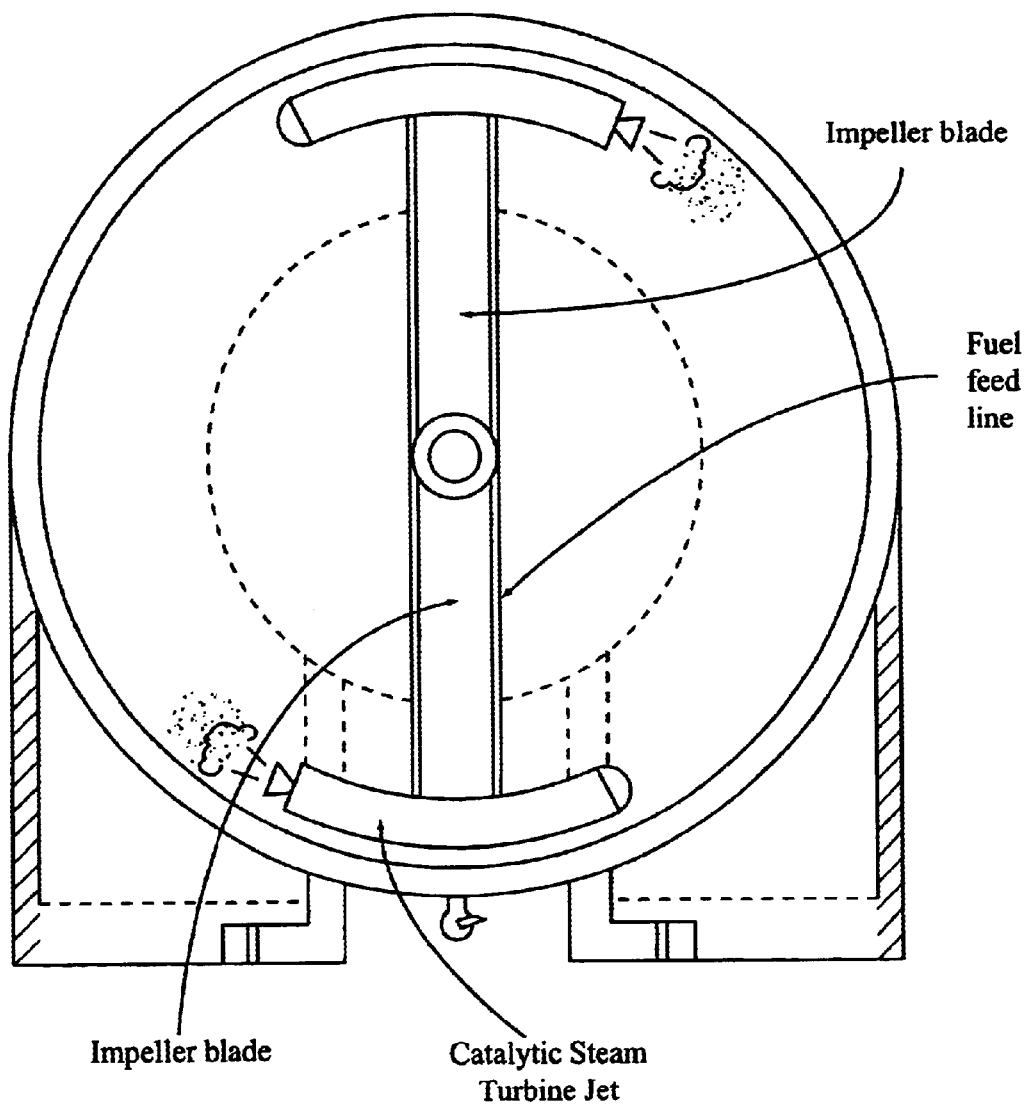
FIG. 2 is a plan view illustrating the rotor and impeller blade assembly along axis A—A in FIG. 1.

FIG. 2 illustrates a preferred configuration of the rotor assembly of FIG. 1, viewed along axis A—A. FIG. 2 shows two catalytic steam turbine jets (e.g., rocket engines) disposed at the distal ends of axially opposed impeller blades. Fuel can be supplied to the catalytic steam turbine jets by any mechanism known in the art, including the use of various pumping apparatus. The fuel feed lines supply fuel to the catalytic steam turbine jets, although other mechanisms known to those skilled in the art may be used. While the rotor assembly of FIG. 2 depicts only two impeller blades, additional blades may be employed in the invention, and additional rocket engines may be employed.

In operation, the turbine can generate energy simply by supplying the rocket engine with the suitable fuel. The rocket engine will thrust the impeller blades in axially opposed directions causing the rotor to rotate. When the material in the rocket engine is spent and the rotor slows down, the system can be shut down, and the catalyst replenished, or the spent hydride replenished. Alternatively, a plurality of rotors may be attached to the same generating apparatus so that when one rotor assembly exhausts its fuel generating capability (e.g., the catalyst is spent, or the metal hydride is used up), an additional rotor assembly can be brought on-line, and the exhausted rotor assembly brought offline for regeneration. Those skilled in the art are capable of designing a suitable system of rotor assemblies to minimize down time, and to maximize the speed by which the fuel generating material (e.g., catalyst or metal hydride, or other like material) can be replaced.

Figure 3:
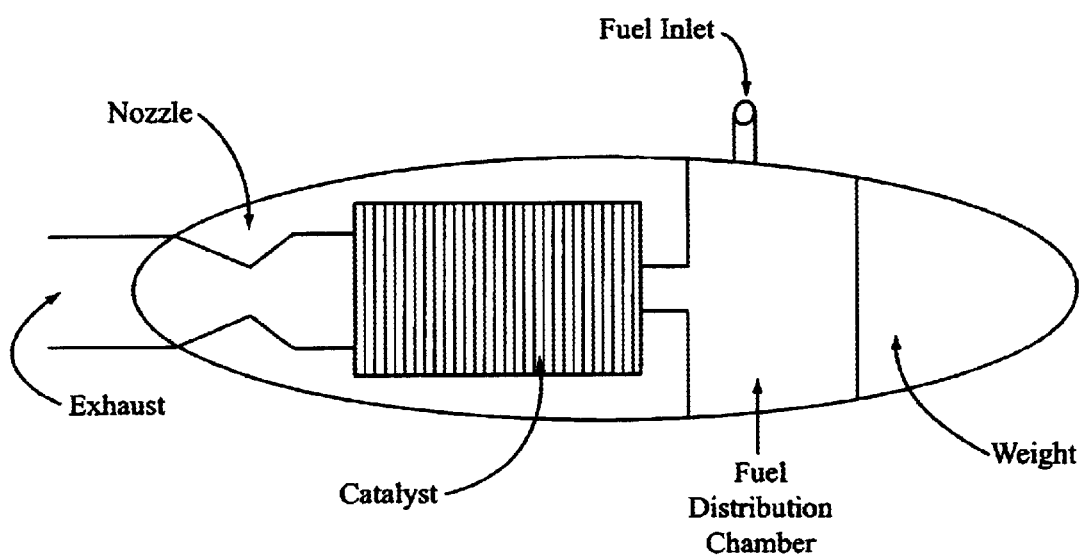
FIG. 3 is a plan view illustrating a preferred rocket engine capable of catalytically decomposing hydrogen peroxide.

In a preferred embodiment, the rocket engine is a hydrogen peroxide catalytic decomposition engine that generates exhaust (and hence thrust) by the decomposition of hydrogen peroxide. Such a rocket engine is illustrated in FIG. 3. It is preferred that there are at least two catalytic steam turbine jets located on axially opposing rotor blade-blade tips. The rocket engines may be about 36 mm in diameter and weigh about 500g. These rocket engines are similar to the rocket engines used in the Intora-Firebird helicopter system, and are available from Intora-Firebird, PLC, London Southend Airport, England. There are no moving parts, and together the catalytic steam turbine jets are capable of providing approximately 100 hp.

The catalytic steam turbine jets useful in the present invention utilize hydrogen peroxide. It is preferred to use concentrated hydrogen peroxide, at a concentration of from about 75% to about 95%, more preferably from about 80% to about 90%, and most preferably from about 85% to about 87%. The hydrogen peroxide fuel preferably is fed into the engine in a fuel distribution chamber disposed in front of the catalyst, (FIG. 3). As known in the art, a chemical reaction takes place that results in the catalytic decomposition of the hydrogen peroxide into oxygen and water.

The heat produced during this chemical decomposition reaction causes the water to be converted into super-heated steam. The combined expansion of the oxygen and the super-heated steam in the nozzle portion of the catalytic steam turbine jet causes the hot gas to be released from the engine at supersonic speed, thereby providing a thrust in the range of from about 20 pounds to about 50 pounds per pound of engine. Preferably, the thrust is in the range of from about 30 to about 40 pounds per pound of engine, and more preferably, from about 34 to about 38 pounds per pound of engine. Thus, smaller or larger engines may be employed to produce larger or smaller amounts of thrust, so long as the rotor impeller blades can withstand the forces generated by the thrust. Skilled artisans are capable of designing a suitably sized catalytic steam turbine jet using the guidelines provided herein.

In the engine shown in FIG. 3, there is no flame or air pollution, and the only by-product is oxygen and water. The thrust and power is derived from the tips of the rotor impeller blades and not from a centrally-located conventional engine, and consequently, there is little or no torque.

The engine shown in FIG. 3 typically comprises about four main parts. The front portion of the engine usually includes a weight that has an aerodynamically designed outer surface and has been machined on the inside to act as a balance weight. The main body of the engine may be threaded at one end to receive the weight portion, or it may be integrally formed with the weight. The main body also preferably is shaped at the tail end to produce the jet velocity. Fuel preferably is injected at the fuel inlet an into the fuel distribution chamber where it is directed through the catalyst. The catalyst preferably contain layers of stainless steel and silver mesh that are spaced to provide optimum performance with maximum catalyst life.

The catalyst is designed to last anywhere from 1 hour to about 100 hours, although even longer times can be achieved using more expensive catalysts. Using a relatively cheap catalyst comprised of layers of stainless steel and silver, the catalyst typically will require replenishment after about 4 hours, and more preferably after about 5 hours. As stated above, there may be a plurality of rotor assemblies that can be brought on-line and taken off-line to accommodate replenishment of the catalyst without having to shut the turbine down. Because the catalytic steam turbine jets have no moving parts, maintenance is limited to changing the catalyst and a quick occasional visual check for damage.

Referring again to FIG. 1, the fuel can be stored in a removable tank, or a plurality of tanks that hold a sufficient quantity of fuel. When a metal hydride engine is used, the fuel is water, thereby obviating the need for a fuel storage tank. The fuel preferably is fed to the system initially by a manual pump, or by an electric pumping system. Once the rotor assembly begins to turn, however, a mechanical or electric pump connected to a drive link on the rotor assembly can draw the fuel from the tank to the tip of the impeller blades in the rotor assembly.

In another preferred embodiment, the rocket engine includes a metal hydride, or mixture thereof, which is capable of generating hydrogen. The rocket engine also preferably is equipped with a suitable combustion chamber for combustion of the hydrogen to create thrust and exhaust typically comprising carbon dioxide and steam, and most preferably only water and steam. Metal hydrides are potentially ideal candidates for hydrogen storage and transportation. As hydrogen carriers, they provide high hydrogen storage capacities (up to for example 7.6 wt. % in $Mg_2H_2$) and full safety. The safety is provided by endothermic reaction of hydrogen release, which excludes spontaneous (explosive) or uncontrolled reaction. Alternatively, the metal hydride can be reacted with water to produce hydrogen via an exothermic reaction.

Metal hydrides are advantageous in that they can be handled and stored at ambient temperature without any atmosphere or pressure requirements. Such makes them economically favorable by elimination of cryogenic equipment necessary to use with liquid hydrogen or activated charcoal. Metal hydrides are also very stable. Such is advantageous from a safety and economical point of view. However, because of their stability, most of the metal hydrides require elevated temperatures to initiate desorption.

Examples of metal hydrides having a high stability are $MgH_2$ or $Mg_2NiH_4$, $Mg_2H_2$, $CaH_2$, $Ca_2H_2$, and the like. They exhibit excellent hydrogen storage potential—with large hydrogen storage capacity (7.65 wt. % for $MgH_2$ or 3.6 wt. % for $Mg_2NiH_4$), low cost of the material and easy handling. They also are relatively inexpensive to produce, and can generate a significant amount of hydrogen upon reaction with a small amount of water. Thus, the fuel fed to the rocket engine is water, and the exhaust is a substantially free of toxins.

The use of solid hydridable materials to store hydrogen is disclosed in numerous patents, such as U.S. Pat. Nos. 3,508,514, 3,516,263 and 4,036,944, each incorporated herein by reference. These solid hydridable materials are characterized by an interrelation of temperature, pressure and hydrogen content, such that, at any given temperature, the hydrogen content of the hydridable material is determined by the partial pressure of the hydrogen in contact with that material. Generally, as temperature rises it takes a greater partial pressure of hydrogen to maintain a given concentration of hydrogen in the hydridable material. The converse is also true as temperature decreases.

The reversible storage of hydrogen in the form of an intermetallic hydride has several advantages over conventional gaseous and liquid hydrogen storage. The use of metal hydrides offer pronounced volumetric advantages over compressed gas, along with much lower required pressure, a safety advantage. In addition, the use of metal hydrides provides excellent insurance that the hydrogen released from the containers is of very high purity. Reversible storage of hydrogen is disclosed in, for example, U.S. Pat. Nos. 5,697, 221, and 5,882,623, the disclosures of which are incorporated by reference herein in their entirety.

Engines using metal hydrides to create hydrogen are disclosed in, for example, U.S. Pat. No. 5,082,048, the disclosure of which is incorporated by reference herein in its entirety. Other engines using metal hydrides to create combustible engines are disclosed in Japanese Laid-Open Patent Publication No. 62-49100, and U.S. Pat. Nos. 5,987,895, 5,092,281, 5,088,452, and 5,067,447, the disclosure of which is incorporated by reference herein in its entirety. These engines are suitable for use as the rocket engines of the present invention, and those skilled in the art are capable of designing a suitable rocket engine using the guidelines provided herein, as well as the teachings in the aforementioned documents.

The housings used in the turbine of the invention will be normally fully enclosed, except for pressure vacuum relief valves and drain plugs. There will be special systems that will employ cage type housings of similar overall shape. The units can be mounted horizontally or vertically and any position in between which would be a perfect arrangement for such a highly versatile and powerful motive power source. The original drawing of the Caturbine (FIG. 1) shows the turbine mounted on a jack shaft supported by bearings on each end of the shaft and inside the housing enclosing the spinning catalytic jet motors. When a generator has a shaft and bearings capable of handling thrust and load from the Caturbine it could be mounted directly onto the generator drive shaft. An electronic governor can be installed to control the speed of rotation of the rotor assembly.

Those skilled in the art will appreciate that the turbine can be manufactured with heavier shafts, bearings and other components to withstand all of the stresses anticipated by the rotor assembly of the invention.

The present invention is specifically for the vertical propulsion system (FIG. 1) which consists of $H_2O_2$ (Hydrogen Peroxide) being hand pumped out of 2 tanks and being injected into the rotor tip-mounted catalytic jets via tubes embedded in the rotor blades (FIG. 2). At the tip of each blade is a tiny, one pound rocket jet motor. When the fluid enters the motors, it hits layers of silver and stainless steel mesh causing the hydrogen peroxide to decompose explosively into steam and oxygen. The process unleashes about 100 horsepower from each unit. The only exhaust is steam, no sound The invention also encompasses a re-design of all the assembled rotary components ensuring the proper tensile strength required for standard engine production. They will be scaled to fit into housings which resemble single or multi-stage blowers or vacuum pumps but will be custom designed and fabricated from steel, aluminum or high impact plastic, castings would be preferred.

The invention contemplates enclosure of all the assembled rotary components inside housings that resemble single or multi-stage centrifugal blowers or vacuum pumps, except that the rotary members (impeller blades) are self-propelled to turn its integral driven shaft which will transmit drive to a large electric generator or other comparable system. The jet motors can be curved to clear the radius of the housings. There will be no vents between the sections but each one will have a small pressure/vacuum relief valve to control the internal pressure of each rotor section housing from catalyst-produced high pressure steam and probable condensation when slowing down and cooling. Drain cocks should be inserted on bottom, and can be opened and closed manually, automatically via a controlled system, and remotely from a control station remote from the turbine. A rotary union type joint will allow hydrogen peroxide fluid, or water, to be fed through the bored center of the drive shaft to the drilled and tapped holes at 90o into the central bore of the rotor. The drilled and tapped side holes can be measured from the end of the shaft to meet the side entry for the rotary union tube to the curved (radius) rotor jet motor.

The assembled rotary components can be propelled when battery powered diaphragm pumps, or pumps powered manually at first, and then mechanically or electronically after the turbine is in operation, deliver hydrogen peroxide fluid through the rotary union and into the tubes enclosed within the impeller blades thereby injecting the fluid into the catalytic steam turbine jet motors. When the fluid enters the motors, it hits layers of silver and platinum in stainless steel mesh (the catalyst) which causes the hydrogen peroxide to decompose explosively into steam, (water) and oxygen. The diameter and length of the jet motor and content of silver/platinum+hydrogen peroxide (3" diameter ×18" long curved jet)=300 (est.) horsepower for each rocket jet motor.

The hydrogen peroxide ($H_2O_2$), jet motors tip mounted to freewheeling rotor impeller blades can convert the hydrogen peroxide into a motive power steam turbine. A myriad of power generating systems can be made using the present invention, for example, by scaling down the dimensions of all the free wheeling components and simultaneously strengthening them and the new reinforced hubs to shaft drive. Such systems include electric generators, cars, trucks, airplanes, wind turbines, ships, submarines, generators for every house and factory, hospitals, silent running railroad locomotives.

While the invention has been described in detail with reference to the particularly preferred embodiments described herein, those skilled in the art will appreciate that various modifications may be made thereto without departing from the spirit and scope thereof. All documents described above are incorporated by reference herein in their entirety.

What is claimed is:

1. A turbine activated by a catalytic process turbine comprising:
    a rotor connected to a shaft and comprising a plurality of impeller blades;
    at least two rocket engines disposed on axially opposed ends of at least two impeller blades to drive the rotor; and
    an energy generating mechanism attached to the shaft, wherein the rocket engines either produce steam by catalytically decomposing hydrogen peroxide, or produce steam by reaction of water with a metal hydride to produce hydrogen, which then is combusted to generate steam.

2. The catalytic turbine as claimed in claim 1, wherein the rocket engines are designed to generate exhaust that does not contain any substantial amount of toxins, and that produce the exhaust without the need for fossil fuels or nuclear energy.

3. The catalytic turbine as claimed in claim 1, wherein the catalyst comprises layers of stainless steel and silver mesh.

4. The catalytic turbine as claimed in 1, further comprising a housing surrounding the catalytic turbine.

5. The catalytic turbine as claimed in claim 4, wherein the housing comprises a pressure relief valve to relieve pressure generated by the steam, and a drain plug to remove condensed steam.

6. The catalytic turbine as claimed in claim 1, wherein the rocket engines provide a thrust in the range of from about 20 pounds to about 50 pounds per pound of engine.

7. The catalytic turbine as claimed in claim 6, wherein the rocket engines provide a thrust in the range of from about 30 to about 40 pounds per pound of engine.

8. The catalytic turbine as claimed in claim 7, wherein the rocket engines provide a thrust in the range of from about 34 to about 38 pounds per pound of engine.

9. The catalytic turbine as claimed in claim 1, wherein the metal hydride is selected from the group consisting of $MgH_2$, $Mg_2NiH_4$, $Mg_2H_2$, $CaH_2$, $Ca_2H_2$, and mixtures thereof.

10. The catalytic turbine as claimed in claim 9, wherein the metal hydride is $MgH_2$.

* * * * *